United States Patent
Wang (10) Patent No.: US 12,075,024 B2
(45) Date of Patent: Aug. 27, 2024

(54) SYSTEM AND METHOD FOR COMPUTING RELATIVE ROTATION AND RELATIVE TRANSLATION OF BACK-TO-BACK CAMERAS

(71) Applicant: INDUSTRIAL TECHNOLOGY RESEARCH INSTITUTE, Hsinchu (TW)

(72) Inventor: Te-Mei Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 435 days.

(21) Appl. No.: 17/556,401

(22) Filed: Dec. 20, 2021

(65) Prior Publication Data
US 2023/0199166 A1    Jun. 22, 2023

(51) Int. Cl.
G06T 7/80 (2017.01)
G06T 1/00 (2006.01)
(Continued)

(52) U.S. Cl.
CPC ......... *H04N 17/002* (2013.01); *G06T 1/0007* (2013.01); *G06T 3/02* (2024.01); *G06T 7/80* (2017.01)

(58) Field of Classification Search
CPC .... H04N 17/002; H04N 23/90; G06T 1/0007; G06T 3/02; G06T 7/80
See application file for complete search history.

(56) References Cited

U.S. PATENT DOCUMENTS 8,111,904 B2    2/2012   Wallack et al.
9,843,723 B2 *  12/2017  Osborne ................ H04N 23/58
(Continued)

FOREIGN PATENT DOCUMENTS

CN    108648240 A    10/2018
CN    107948639 B    5/2020
(Continued)

OTHER PUBLICATIONS

Kumar et al., "Simple Calibration of Non-overlapping Cameras with a Mirror," 2008 IEEE Conference on Computer Vision and Pattern Recognition, 2008, pp. 1-7, 7 pages total.
(Continued)

*Primary Examiner* — Phuoc Tran
(74) *Attorney, Agent, or Firm* — Birch, Stewart, Kolasch & Birch, LLP (57) ABSTRACT

A system and a method for computing the relative rotation and the relative translation of back-to-back cameras comprise: a fixed mode and an adjustment mode. In the fixed mode, a reversible external camera is installed next to the back-to-back cameras, the external camera is flipped to shoot a calibration pattern from different positions and angles, the intrinsic and extrinsic parameters of each camera are computed, and then a reverse calculation is performed on the extrinsic parameters, as such the amount of translation and rotation of the back-to-back cameras are obtained. When the relative angle of the back-to-back cameras changes, the angle is automatically detected and the extrinsic parameters of the camera computed at the fixed mode is modified, and then the reverse calculation is performed on the extrinsic parameters to adjust the amount of translation and rotation of the back-to-back cameras.

14 Claims, 8 Drawing Sheets

(51) Int. Cl.
  *G06T 3/02*   (2024.01)
  *H04N 17/00*  (2006.01)

(56) References Cited

U.S. PATENT DOCUMENTS

| | | | |
|---|---|---|---|
| 10,397,495 | B1 | 8/2019 | Graber et al. |
| 10,992,921 | B1 | 4/2021 | Cui |
| 11,228,781 | B2* | 1/2022 | Newman .............. H04N 19/198 |
| 2020/0118287 | A1 | 4/2020 | Hsieh et al. |
| 2022/0198697 | A1* | 6/2022 | Gomita .................... G06T 7/97 |

FOREIGN PATENT DOCUMENTS

| | | |
|---|---|---|
| CN | 111148970 A | 5/2020 |
| TW | I485650 B | 5/2015 |
| TW | I617405 B | 3/2018 |

OTHER PUBLICATIONS

Ohno, "Multi-angle-view monocular camera using a polarization image sensor," Applied Optics, vol. 58, No. 15, 2019, pp. 4036-4041, 6 pages total.

Pagel, "Calibration of Non-Overlapping Cameras in Vehicles," 2010 IEEE Intelligent Vehicles Symposium, San Diego, CA, USA, Jun. 21-24, 2010, pp. 1178-1183, 6 pages total.

Wei et al., "Extrinsic parameters calibration of multi-camera with non-overlapping fields of view using laser scanning," Optics Express, vol. 27, No. 12, 2019, pp. 16719-16737, 19 pages total.

Xia et al., "Global calibration of non-overlapping cameras: State of the art," Optik, vol. 158, 2018, pp. 951-961, 11 pages total.

Zhu et al., "Robust Plane-based Calibration of Multiple Non-Overlapping Cameras," 2016 Fourth International Conference on 3D Vision, 2016, pp. 658-666, 9 pages total.

* cited by examiner

SYSTEM AND METHOD FOR COMPUTING RELATIVE ROTATION AND RELATIVE TRANSLATION OF BACK-TO-BACK CAMERAS

TECHNICAL FIELD

The disclosure relates in general to a system and a method for computing a relative rotation matrix and a relative translation vector of back-to-back cameras.

BACKGROUND

Normally, when correcting dual cameras, the field of view of the two cameras need to overlap with each other and the two cameras shoot the same pattern at the same time. The viewing angles of the back-to-back cameras currently available in the market all are greater than 180°, and the overlapping part of image is used for comparison, so that the picture has superior brightness and colors in the stitching part. However, the stacked images have greater deformation at the edges, and the relative rotation and the relative translation of the back-to-back cameras are too large and cannot be accurately computed. When the viewing angles of the back-to-back cameras both are less than 180°, the relative rotation and the relative translation cannot be obtained using the technology of the prior art due to the lack of overlapping part.

According to the prior art, after the dual-cameras are corrected, if relative position and angle between the dual-cameras change, the calibration pattern needs to be shot again and the intrinsic parameters and the extrinsic parameters are computed again, which is a perplexing task for ordinary users.

SUMMARY

The present disclosure is directed to a system and a method for computing a relative rotation matrix and a relative translation vector of back-to-back cameras. When the viewing angles of the back-to-back cameras both are less than 180° and do not overlap with each other, the relative rotation matrix and the relative translation vector of the back-to-back cameras are computed, so that correspondence in the content of images shot by the back-to-back cameras could be formed. The system has a fixed mode and an adjustment mode. In the fixed mode, a predetermined rotation matrix and a predetermined translation vector of the back-to-back cameras are computed. In the adjustment mode, when the relative angle of the back-to-back cameras changes, the relative rotation matrix and the relative translation vector of the back-to-back cameras are automatically corrected without having to shoot the calibration pattern again.

According to one embodiment of the present disclosure, a system for computing a relative rotation matrix and a relative translation vector of the back-to-back cameras is provided. In the fixed mode, the system includes a first camera, a second camera, an external camera, a calibration pattern, a computation unit for intrinsic parameters and a computation unit for extrinsic parameters. The first camera and the second camera form a set of back-to-back cameras; the viewing angles of the first camera, the second camera and the external camera all are less than 180°. The viewing angle of the first camera does not overlap with the viewing angle of the second camera. The external camera is installed on a rotatable axis, which is next to the first camera and the second camera. The rotatable axis is inserted between the first camera and the second camera for flipping the external camera to face the same direction with the first camera that overlaps their viewing angles. The rotatable axis can also flip the external camera to face the same direction with the second camera that overlaps their viewing angles. The flipped position (x, y, z) and angles (yaw, roll, pitch) of the external camera are known and fixed, which are set as a third set of extrinsic parameters. A calibration pattern with a known size is used. When the first camera and the external camera face the same direction, the calibration pattern is moved and rotated, and a first set of non-coplanar images is shot by the first camera and the external camera. When the second camera and the external camera face the same direction, the calibration pattern is moved and rotated, and a second set of non-coplanar images is shot by the second camera and the external camera. The computation unit for intrinsic parameters computes a first set of intrinsic parameters of the first camera, a second set of intrinsic parameters of the second camera and a third set of intrinsic parameters of the external camera according to the first set of non-coplanar images and the second set of non-coplanar images respectively. The computation unit of computation unit for extrinsic parameters computes the first set of extrinsic parameters according to the first set of non-coplanar images, the first set of intrinsic parameters and the third set of intrinsic parameters. The first set of extrinsic parameters includes the rotation matrix and the translation vector between the first camera and the external camera. The computation unit of computation unit for extrinsic parameters computes the second set of extrinsic parameters according to the second set of non-coplanar images, the second set of intrinsic parameters and the third set of intrinsic parameters. The second set of extrinsic parameters includes the rotation matrix and the translation vector between the second camera and the external camera. When the first camera is used as a reference camera, the computation unit for extrinsic parameters performs a reverse operation on the second set of extrinsic parameters to obtain a reversed second set of extrinsic parameters, multiplies the reversed second set of extrinsic parameters, the first set of extrinsic parameters and the third set of extrinsic parameters together to obtain a product, and performs a reverse operation on the product to obtain a rotation matrix and a translation vector (x, y, z) between the first camera and the second camera; or when the second camera is used as a reference camera, the computation unit for extrinsic parameters performs a reverse operation on the first set of extrinsic parameters to obtain a reversed first set of extrinsic parameters, multiplies reversed first set of extrinsic parameters with the second set of extrinsic parameters and the third set of extrinsic parameters to obtain a product, and performs a reverse operation on the product to obtain a rotation matrix and a translation vector (x, y, z) between the first camera and the second camera.

According to another embodiment of the present disclosure, back-to-back cameras with adjustment mode are provided. The back-to-back cameras include a first camera, a second camera, an automatic angle detection unit and a computation unit for extrinsic parameters. The back-to-back cameras are composed of the first camera and the second camera; the viewing angles of the first camera and the second camera both are less than 180° and do not overlap with each other. The first camera has a predetermined first set of extrinsic parameters, including a rotation matrix and a translation vector, and is stored in the internal memory or the external memory of the first camera. The second camera has a predetermined second set of extrinsic parameters, including a rotation matrix and a translation vector, and is stored in the internal memory or the external memory of the second camera. The automatic angle detection unit has a predetermined third set of extrinsic parameters, including a rotation matrix and a translation vector, and is stored in the internal memory or the external memory of the automatic angle detection unit. The predetermined first set of extrinsic parameters, the second set of extrinsic parameters, and the third set of extrinsic parameters all are obtained in the fixed mode. The automatic angle detection unit is used to detect a relative angle between the first camera and the second camera. The relative angle could change on single axis. After the relative angle changes, the automatic angle detection unit automatically corrects the third set of extrinsic parameters. The computation unit for extrinsic parameters is used to multiply the predetermined first set of extrinsic parameters, the predetermined second set of extrinsic parameters and the corrected third set of extrinsic parameters together to obtain a product, and to perform a reverse operation on the product to obtain a rotation matrix and a translation vector between the first camera and the second camera after the relative angle has changed.

According to an alternate embodiment of the present disclosure, a method for computing relative a rotation matrix and a relative translation vector of the back-to-back cameras is provided. The back-to-back cameras are composed of a first camera and a second camera. The viewing angles of the two cameras both are less than 180° and do not overlap with each other. The method for computing the relative rotation matrix and the relative translation vector of the back-to-back cameras has a fixed mode and an adjustment mode. In the fixed mode, the external camera is installed next to the first camera and the second camera, and is installed on a rotatable axis. The rotatable axis is inserted between the first camera and the second camera for flipping the external camera to face the same direction with the first camera that overlaps their viewing angles, and for flipping the external camera to face the same direction with the second camera that overlaps their viewing angles. After the external camera is flipped, the flipped position and the angles are known, and are fixed and set as a third set of extrinsic parameters by a mechanism. When the first camera and the external camera face the same direction, a calibration pattern with a known size is moved and rotated, and a first set of non-coplanar images is shot by the first camera and the external camera; when the second camera and the external camera face the same direction, the calibration pattern is moved and rotated, and a second set of non-coplanar images is shot by the second camera and the external camera. A first set of intrinsic parameters of the first camera, a second set of intrinsic parameters of the second camera and a third set of intrinsic parameters of the external camera are respectively computed according to the first set of non-coplanar images and the second set of non-coplanar images. The first set of extrinsic parameters, including a rotation matrix and a translation vector between the first camera and the external camera, is computed according to the first set of non-coplanar images, the first set of intrinsic parameters and the third set of intrinsic parameters. The second set of extrinsic parameters, including a rotation matrix and a translation vector between the second camera and the external camera, is computed according to the second set of non-coplanar images, the second set of intrinsic parameters and the third set of intrinsic parameters. When the first camera is used as a reference camera, a reverse operation is performed on the second set of extrinsic parameters to obtain a reversed second set of extrinsic parameters, and reversed second set of extrinsic parameters, the first set of extrinsic parameters and the third set of extrinsic parameters are multiplied together to obtain a product, then a reverse operation is performed on the product to obtain a rotation matrix and a translation vector (x, y, z) between the first camera and the second camera; or when the second camera is used as a reference camera, a reverse operation is performed on the first set of extrinsic parameters to obtain a reversed first set of extrinsic parameters, then reversed first set of extrinsic parameters, the second set of extrinsic parameters and the third set of extrinsic parameters are multiplied together to obtain a product, then a reverse operation is performed on the reversed first set of extrinsic parameters to obtain a rotation matrix and a translation vector (x, y, z) between the first camera and the second camera. The first set of extrinsic parameters, the second set of extrinsic parameters and the third set of extrinsic parameters obtained in the fixed mode are stored and set as default values. In the adjustment mode, the automatic angle detection unit is used to detect a relative angle between the first camera and the second camera. The relative angle could change on single axis. After the relative angle changes, the automatic angle detection unit automatically corrects the third set of extrinsic parameters. The computation unit for extrinsic parameters is used to multiply the predetermined first set of extrinsic parameters, the predetermined second set of extrinsic parameters and the corrected third set of extrinsic parameters together to obtain a product, and then perform a reverse operation on the product to obtain a rotation matrix and a translation vector between the first camera and the second camera after the relative angle changes.

For the above and other aspects of the present disclosure to be better understood, a number of embodiments are exemplified below, and detailed descriptions are provided with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
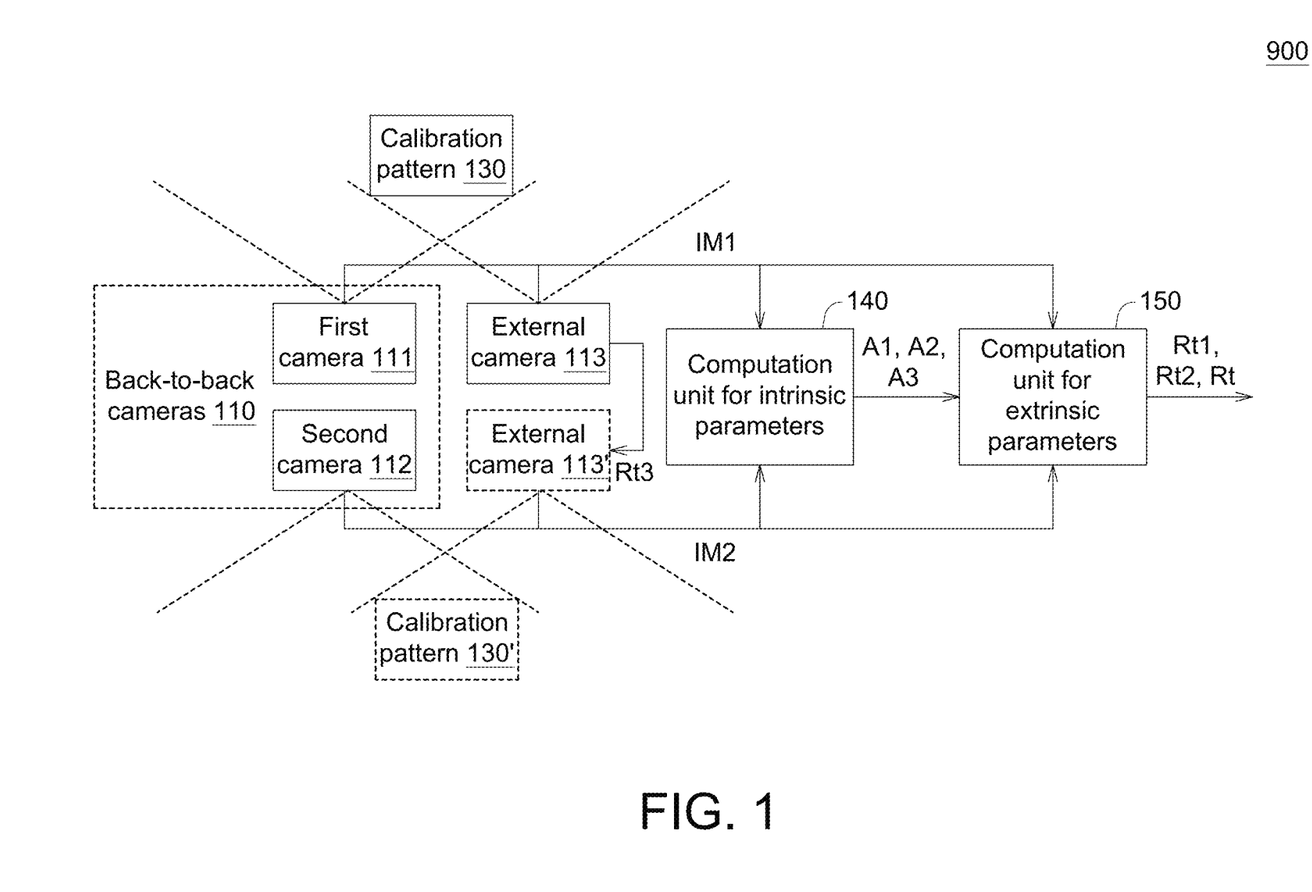
FIG. 1 is a schematic diagram illustrating a system for computing the relative rotation matrix and the relative translation vector of the back-to-back cameras according to an embodiment.

Referring to FIG. 1, a schematic diagram illustrating a system 900 for computing the relative rotation matrix and the relative translation vector of the back-to-back cameras 110 according to an embodiment is shown. The system 900 for computing the relative rotation matrix and the relative translation vector of the back-to-back cameras 110 includes a first camera 111, a second camera 112, an external camera 113, calibration patterns 130 and 130', a computation unit 140 for intrinsic parameters and an computation unit 150 for extrinsic parameters. The calibration pattern 130 and the calibration pattern 130' are the same calibration pattern placed at different positions. The computation unit 140 for intrinsic parameters and the computation unit 150 for extrinsic parameters are used to perform parameter operation, and could be realized by a chip, a circuit, a circuit board, a computer program or a computer-readable recording medium.

Figure 3:
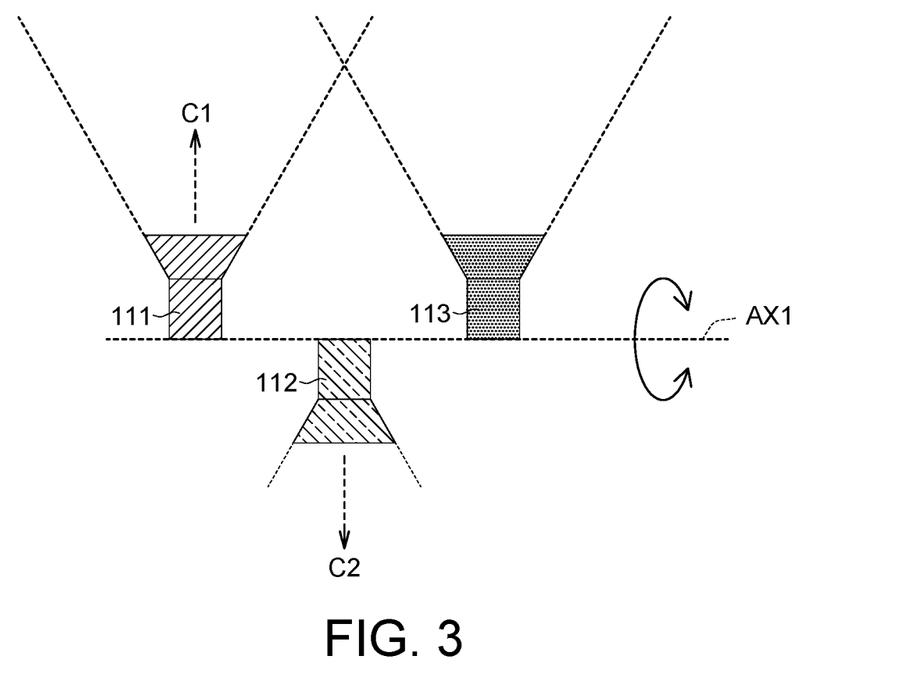
FIGS. 3 to 4 are schematic diagrams illustrating a first camera, a second camera and an external camera according to an embodiment.
Figure 4:
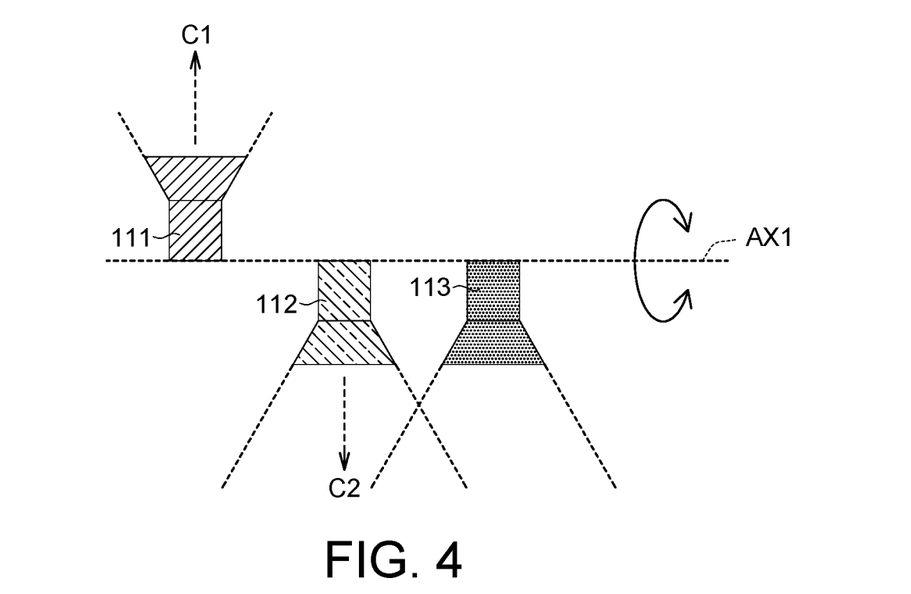

The external camera 113 is arranged only in the fixed mode. Referring to FIGS. 3 to 4, schematic diagrams illustrating a first camera 111, a second camera 112 and external cameras 113 and 113' according to an embodiment are shown. The external camera 113 and the external camera 113' are the same camera flipped to different positions. The viewing angles of the first camera 111, the second camera 112 and the external camera 113 all are less than 180°. The viewing angle of the first camera 111 does not overlap with the viewing angle of the second camera 112. The external camera 113 is installed next to the first camera 111 and the second camera 112. The external camera 113 is arranged on a rotatable axis AX1. The rotatable axis AX1 is inserted between the first camera 111 and the second camera 112. As indicated in FIG. 3, the rotatable axis AX1 is used to flip the external camera 113 to face the same direction with the first camera 111 that overlaps their view angles.

As indicated in FIG. 4, the rotatable axis AX1 is used to flip the external camera 113 to face the same direction with the second camera 112 that overlaps their viewing angles.

The position (x, y, z) of the external camera 113 is fixed by a mechanism of the rotatable axis AX1, and the angles (yaw, roll, pitch) are also fixed at two angles by the mechanism of the rotatable axis AX1. The two angles correspond to the angle of the first camera 111 and the angle of the second camera 112, respectively. When the external camera 113 is flipped, the first camera 111 and the second camera 112 are fixed at a pre-manufactured tool. The position and angles of the external camera 113 are known, and are set as a third set of extrinsic parameters Rt3.

Figure 5:
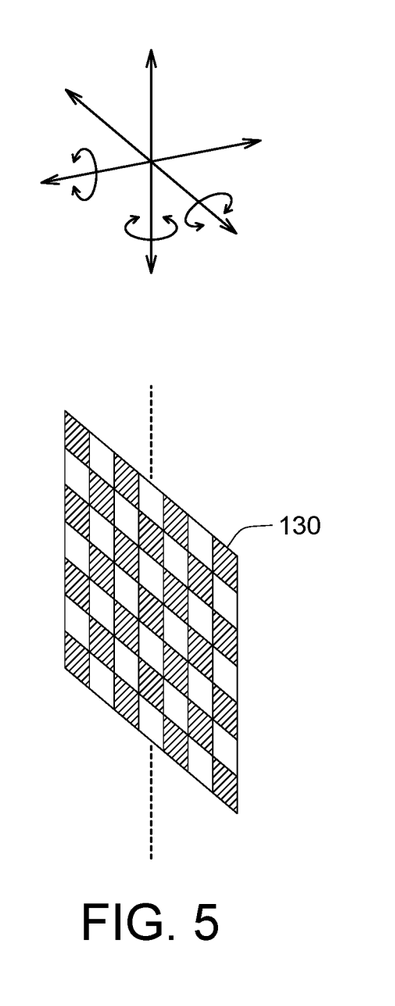
FIG. 5 is a schematic diagram illustrating a calibration pattern according to an embodiment.

Referring to FIG. 5, a schematic diagram illustrating a calibration pattern 130 according to an embodiment is shown. The calibration pattern 130 could be realized by a checkerboard pattern, which could be moved and rotated in a horizontal manner, a vertical manner, or back and forth. The pattern and size of the calibration pattern 130 are known.

As indicated in FIG. 1 and FIG. 3, when the first camera 111 and the external camera 113 face the same direction, the calibration pattern 130 is moved and rotated, and a first set of non-coplanar images IM1 is shot by the first camera 111 and the external camera 113. The first set of non-coplanar images IM1 contains several pairs of images, and each pair of images is composed of two images respectively obtained by the first camera 111 and the external camera 113 facing the calibration pattern 130 in the same state. As the calibration pattern 130 is moved and rotated, several pairs of non-coplanar images IM1 could be obtained.

As indicated in FIG. 1 and FIG. 4, when the second camera 112 and the external camera 113 face the same direction, the calibration pattern 130 is moved and rotated, and a second set of non-coplanar images IM2 is shot by the second camera 112 and the external camera 113. The second set of non-coplanar images IM2 contains several pairs of images, and each pair of images is composed of two images respectively obtained by the second camera 112 and the external camera 113 facing the calibration pattern 130 in the same state. As the calibration pattern 130 is moved and rotated, several pairs of non-coplanar image IM2 could be obtained. The number of first sets of non-coplanar images IM1 and the number of second sets of non-coplanar images IM2 could be identical or different.

Figure 6:
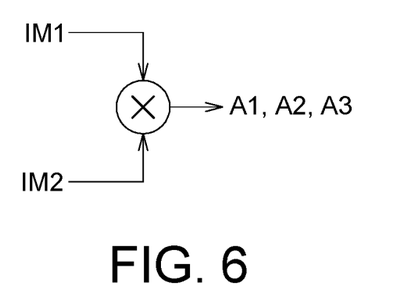
FIG. 6 are schematic diagrams illustrating the operation of a first set of intrinsic parameters of a first camera, a second set of intrinsic parameters of a second camera and a third set of intrinsic parameters of an external camera.

Refer to FIG. 1 and FIG. 6. FIG. 6 is a schematic diagram illustrating the operation of first set of intrinsic parameters A1 of a first camera 111, a second set of intrinsic parameters A2 of a second camera 112 and a third set of intrinsic parameters A3 of an external camera 113. The computation unit 140 for intrinsic parameters respectively computes the first set of intrinsic parameters A1 of the first camera 111, the second set of intrinsic parameters A2 of the second camera 112 and the third set of intrinsic parameters A3 of the external camera 113 according to the first set of non-coplanar images IM1 and the second set of non-coplanar images IM2. There are corresponding positions on each pair of images of the first set of non-coplanar images IM1 or each pair of images of the second set of non-coplanar images IM2, and the lattice points of the calibration pattern 130, the first set of intrinsic parameters A1 of the first camera 111, the second set of intrinsic parameters A2 of the second camera 112 and the third set of intrinsic parameters A3 of the external camera 113 could be obtained according to these correspondence relationships.

Figure 7:
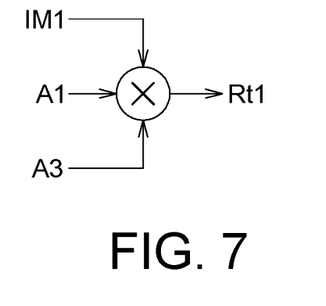
FIG. 7 is a schematic diagram illustrating a first set of extrinsic parameters of a first camera.

Refer to FIG. 1 and FIG. 7. FIG. 7 is a schematic diagram illustrating the operation of a first set of extrinsic parameters Rt1 of a first camera 111. The computation unit 150 for extrinsic parameters computes the first set of extrinsic parameters Rt1 according to the first set of non-coplanar images IM1, the first set of intrinsic parameters A1 and the third set of intrinsic parameters A3. The first set of extrinsic parameters Rt1 includes the rotation matrix and the translation vector between the first camera 111 and the external camera 113.

Figure 8:
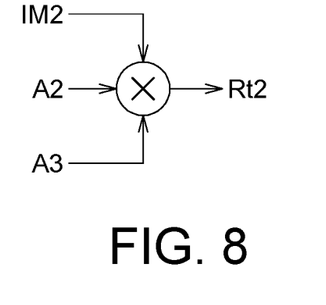
FIG. 8 is a schematic diagram illustrating the operation of a second set of extrinsic parameters of a second camera.

Refer to FIG. 1 and FIG. 8. FIG. 8 is a schematic diagram illustrating the operation of a second set of extrinsic parameters Rt2 of a second camera 112. The computation unit 150 for extrinsic parameters computes the second set of extrinsic parameters Rt2 according to the second set of non-coplanar images IM2, the second set of intrinsic parameters A2 and the third set of intrinsic parameters A3. The second set of extrinsic parameters Rt2 includes the rotation matrix and the translation vector between the second camera 112 and the external camera 113.

Figure 9A:
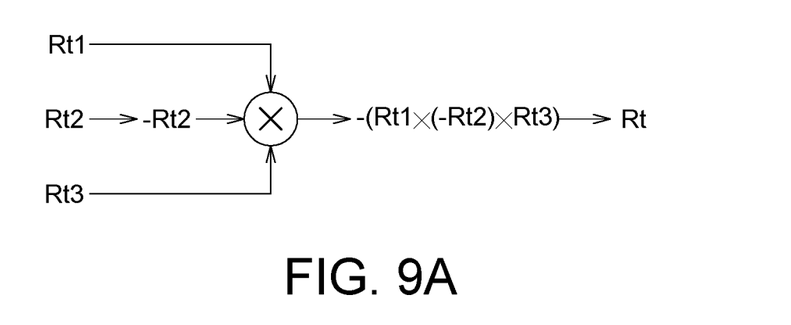
FIG. 9A is a schematic diagram illustrating relative rotation and translation between the first camera and the second camera.

Referring to FIG. 9A, a schematic diagram illustrating a rotation matrix and a translation vector (x, y, z) Rt between the first camera 111 and the second camera 112 is shown. The computation unit 150 for extrinsic parameters performs reverse translation on the second set of extrinsic parameters Rt2 to obtain a reversed second set of extrinsic parameters −Rt2, multiplies the first set of extrinsic parameters Rt1, the reversed second set of extrinsic parameters −Rt2 ("−" represents the reverse operation) and the third set of extrinsic parameters Rt3 together to obtain a product Rt1×(−Rt2)×Rt3, and performs the reverse operation ("−" represents the reverse operation) on the product to obtain a rotation matrix and a translation vector (x, y, z) Rt between the first camera 111 and the second camera 112.

Figure 9B:
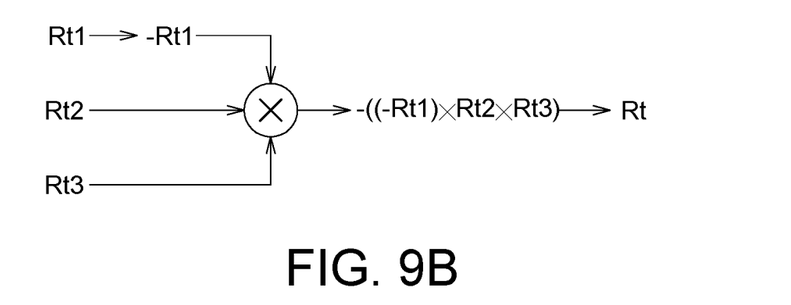
FIG. 9B is a schematic diagram illustrating relative rotation and translation between the first camera and the second camera.

Referring to FIG. 9B, a schematic diagram illustrating a rotation matrix and a translation vector (x, y, z) Rt between the first camera 111 and the second camera 112 is shown. The computation unit 150 for extrinsic parameters performs reverse translation on the first set of extrinsic parameters Rt1 to obtain a reversed first set of extrinsic parameters −Rt1, multiplies the reversed first set of extrinsic parameters −Rt1 ("−" represents the reverse operation), the second set of extrinsic parameters Rt2 and the third set of extrinsic parameters Rt3 together to obtain a product (−Rt1)×Rt2×Rt3, and performs the reverse operation ("−" represents the reverse operation) on the product to obtain a rotation matrix and a translation vector (x, y, z) Rt between the first camera 111 and the second camera 112.

Figure 10:
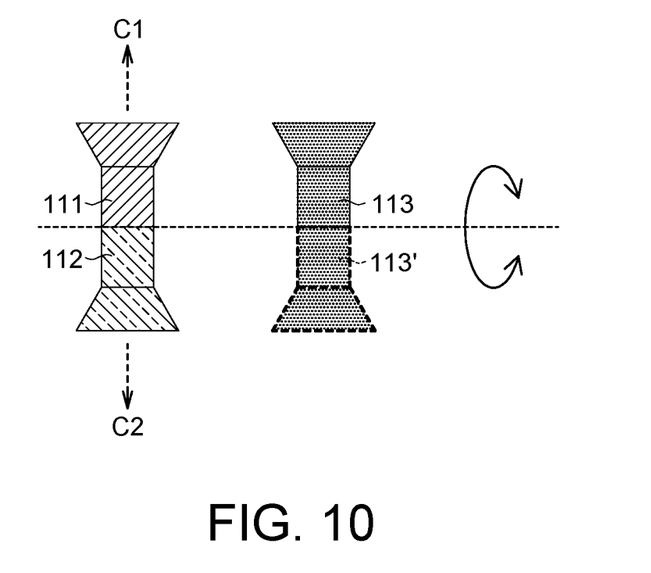
FIGS. 10 to 11 are schematic diagrams illustrating a first camera, a second camera and an external camera according to another two embodiments.
Figure 11:
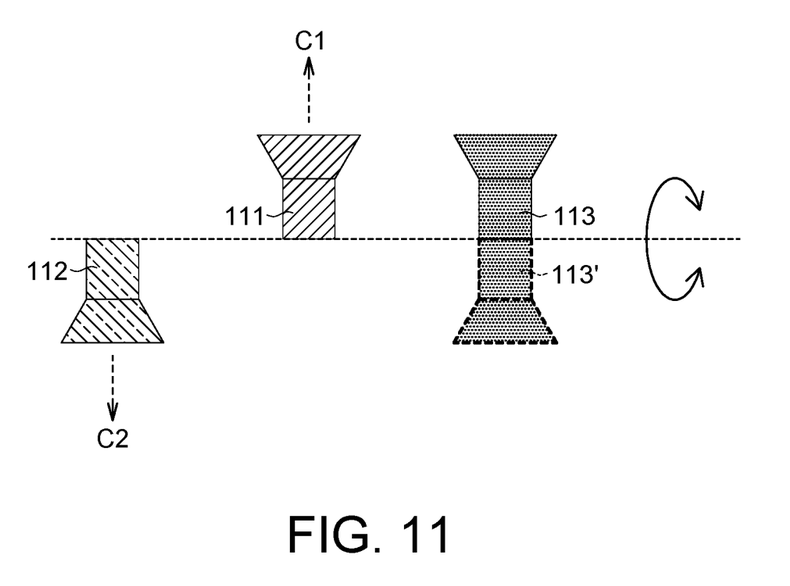

The technologies of the present application could be used in the implementation of FIGS. 3 to 4 as well as other implementations. Referring to FIGS. 10 to 11, schematic diagrams illustrating a first camera 111, a second camera 112 and an external camera 113 according to another two embodiments are shown. As indicated in FIG. 10, an image center C1 of the first camera 111 is aligned with an image center C2 of the second camera 112. As indicated in FIG. 11, the image center C1 of the first camera 111 is located at the left of the image center C2 of the second camera 112; and the image center C2 of the second camera 112 is located at the left of the image center C1 of the first camera 111. The present technology could also be used in the implementation of FIGS. 10 to 11.

Figure 12:
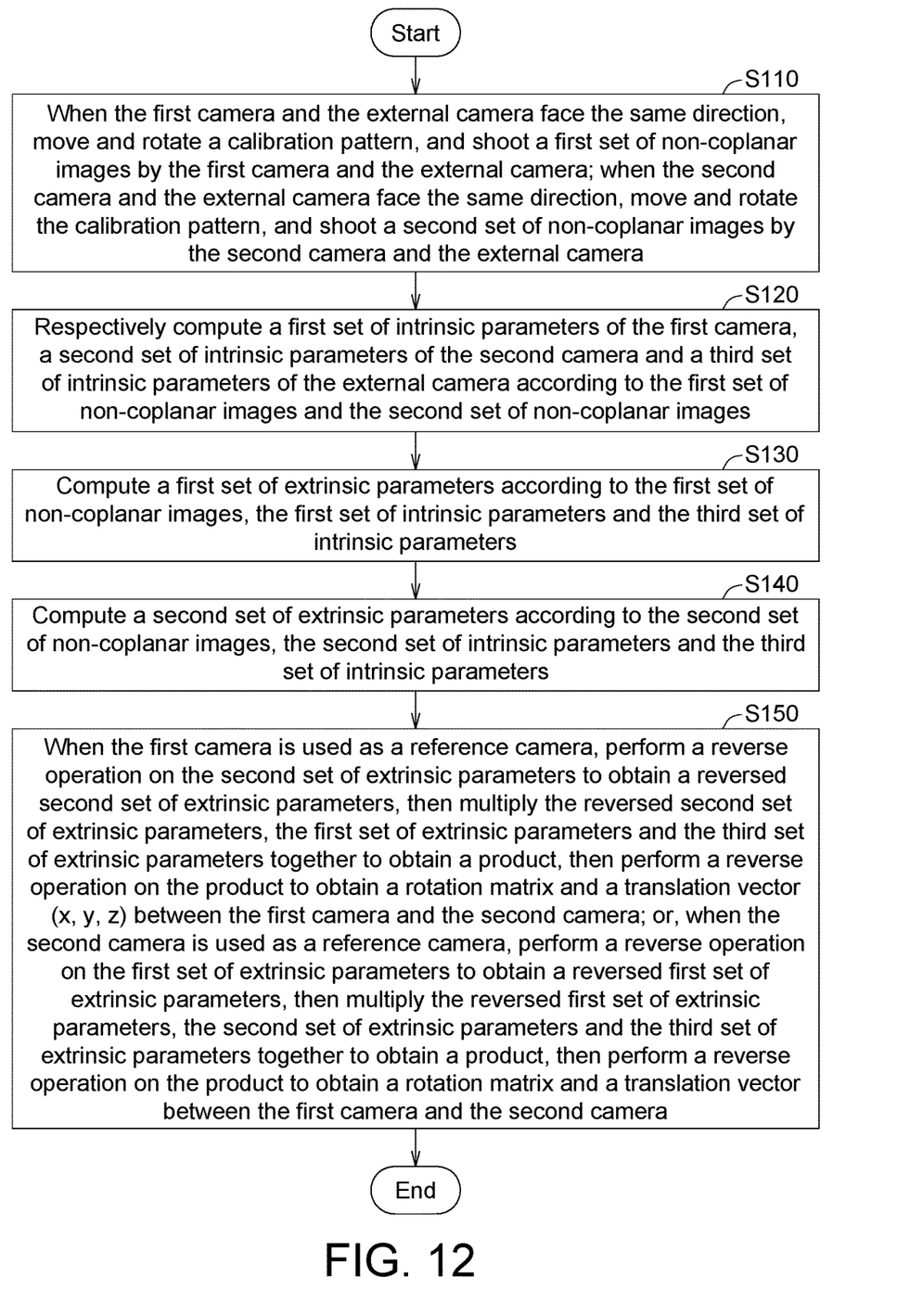
FIG. 12 is a flowchart of a method for computing the relative rotation matrix and the relative translation vector of the back-to-back cameras according to an embodiment.

The present disclosure, based on the above technology, provides a method for computing the relative rotation matrix and the relative translation vector Rt of the back-to-back cameras 110. Referring to FIG. 12, a flowchart of a method for computing the relative rotation matrix and the relative translation vector Rt of the back-to-back cameras 110 according to an embodiment is shown. Refer to FIG. 1. In step S110, when the first camera 111 and the external camera 113 face the same direction, a calibration pattern 130 is moved and rotated, and a first set of non-coplanar images IM1 is shot by the first camera 111 and the external camera 113; when the second camera 112 and the external camera 113 face the same direction, the calibration pattern 130 is moved and rotated, and a second set of non-coplanar images IM2 is shot by the second camera 112 and the external camera 113.

Then, as indicated in FIG. 6, in step S120, a first set of intrinsic parameters A1 of the first camera 111, a second set of intrinsic parameters A2 of the second camera 112 and a third set of intrinsic parameters A3 of the external camera 113 are respectively computed according to the first set of non-coplanar images IM1 and the second set of non-coplanar images IM2.

Afterwards, as indicated in FIG. 7, in step S130, a first set of extrinsic parameters Rt1 is computed according to the first set of non-coplanar images IM1, the first set of intrinsic parameters A1 and the third set of intrinsic parameters A3.

Then, as indicated in FIG. 8, in step S140, a second set of extrinsic parameters Rt2 is computed according to the second set of non-coplanar images IM2, the second set of intrinsic parameters A2 and the third set of intrinsic parameters A3.

Afterwards, as indicated in FIGS. 9A to 9B, in step S150, when the first camera 111 is used as a reference camera, a reverse operation is performed on the second set of extrinsic parameters Rt2 to obtain a reversed second set of extrinsic parameters −Rt2, then the reversed second set of extrinsic parameters −Rt2, the first set of extrinsic parameters Rt1 and the third set of extrinsic parameters Rt3 are multiplied together to obtain a product Rt1×(−Rt2)×Rt3, then a reverse operation is performed on the product Rt1×(−Rt2)×Rt3 to obtain a rotation matrix and a translation vector (x, y, z) Rt between the first camera 111 and the second camera 112; or, when the second camera 112 is used as a reference camera, a reverse operation is performed on the first set of extrinsic parameters Rt1 to obtain a reversed first set of extrinsic parameters −Rt1, then the reversed first set of extrinsic parameters −Rt1, the second set of extrinsic parameters Rt2 and the third set of extrinsic parameters Rt3 are multiplied together to obtain a product (−Rt1)×Rt2×Rt3, then a reverse operation is performed on the product to obtain a rotation matrix and a translation vector (x, y, z) Rt between the first camera 111 and the second camera 112.

The above disclosure relates to the technologies of the fixed mode. The first set of extrinsic parameters Rt1, the second set of extrinsic parameters Rt2 and the third set of extrinsic parameters Rt3 that are obtained in the fixed mode could be used in the adjustment mode. The reverse operation is performed on one of the first set of extrinsic parameters Rt1 and the second set of extrinsic parameters Rt2. In the adjustment mode, the rotation matrix and the translation vector Rt could be automatically computed without using the external camera 113.

Figure 2:
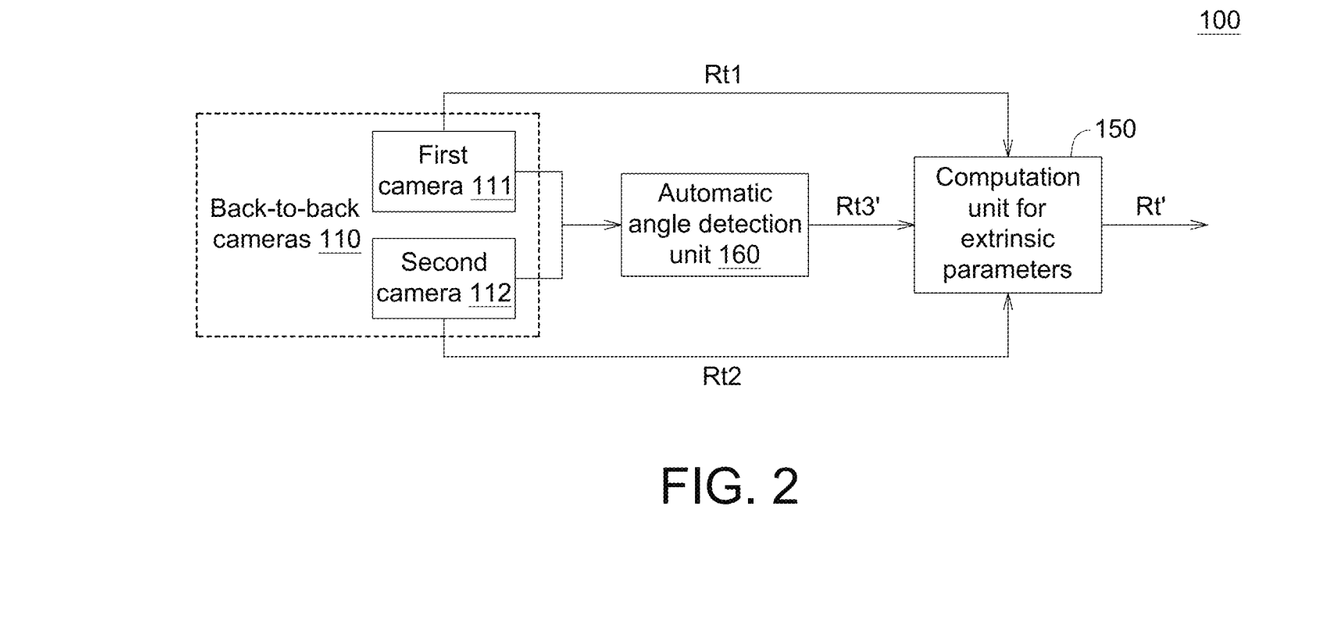
FIG. 2 is a schematic diagram illustrating an electronic device using back-to-back cameras according to an embodiment.

Refer to FIG. 2. The electronic device 100 using back-to-back cameras 110 with automatic adjustment mode includes a first camera 111, a second camera 112, an automatic angle detection unit 160 and an computation unit 150 for extrinsic parameters. The automatic angle detection unit 160 is used to sense the rotation angles of the first camera 111 and the second camera 112, and could be realized by an optical sensor, a magnetic sensor, an electromagnetic sensor or a gear module. The computation unit 150 for extrinsic parameters is used to perform operation, and could be realized by a chip, a circuit, a circuit board, a computer program or a computer-readable recording medium.

The viewing angle of the first camera 111 and the viewing angle of the second camera 112 both are less than 180° and do not overlap with each other. The first camera 111 has a predetermined first set of extrinsic parameters Rt1, including the predetermined rotation matrix and the predetermined translation vector between the first camera and the external camera. The first set of extrinsic parameters Rt1 is stored in the internal memory or the external memory of the first camera 111. The second camera 112 has a predetermined second set of extrinsic parameters Rt2, including the predetermined rotation matrix and the predetermined translation vector between the second camera and the external camera.

The second set of extrinsic parameters Rt2 is stored in the internal memory or the external memory of the second camera 112.

The automatic angle detection unit 160 is used to detect a relative angle between the first camera 111 and the second camera 112. The relative angle could change on single axis. The automatic angle detection unit 160 has a predetermined third set of extrinsic parameters Rt3 stored in the internal memory or the external memory of the automatic angle detection unit 160. After the relative angle changes, the automatic angle detection unit 160 automatically corrects the third set of extrinsic parameters Rt3 to obtain a third set of extrinsic parameters Rt3'.

The computation unit 150 for extrinsic parameters is used to multiply the first set of extrinsic parameters Rt1, the second set of extrinsic parameters Rt2 and the corrected third set of extrinsic parameters Rt3' together to obtain a product and to perform a reverse operation on the product to obtain a rotation matrix and a translation vector Rt' after relative angle between the first camera 111 and the second camera 112 changes. The reverse operation has been performed on one of the first set of extrinsic parameters Rt1 and the second set of extrinsic parameters Rt2 in the fixed mode.

Even when the viewing angle of the first camera 111 does not overlap with the viewing angle of the second camera 112, the relative rotation matrix and the relative translation vector Rt between the rotated first camera 111 and the rotated second camera 112 still could be accurately computed, significantly breaking through the bottleneck in the technology of the back-to-back cameras 110.

It will be apparent to those skilled in the art that various modifications and variations could be made to the disclosed embodiments. It is intended that the specification and examples be considered as exemplary only, with a true scope of the disclosure being indicated by the following claims and their equivalents.

Although the present disclosure is disclosed above with several embodiments, it should be understood that these embodiments are not for limiting the present disclosure. Anyone skilled in the technology field of the present disclosure will be able to make suitable modifications or variations provided that the spirit of the present disclosure is not breached. Thus, the scope of protection of the present disclosure is defined and claimed as follows.

What is claimed is:

1. A system for computing relative rotation and relative translation of back-to-back cameras, comprising:
    a first camera, wherein a viewing angle of the first camera is less than 180°;
    a second camera, wherein a viewing angle of the second camera is less than 180° and does not overlap with the viewing angle of the first camera;
    an external camera, wherein a viewing angle of the external camera is less than 180°; the external camera is installed on a rotatable axis, which is next to the first camera and the second camera; the rotatable axis is inserted between the first camera and the second camera for flipping the external camera to face a direction identical with the first camera that overlaps their viewing angles, and for flipping the external camera to face a direction identical with the second camera that overlaps their viewing angles, the flipped position (x, y, z) and angles (yaw, roll, pitch) of the external camera are fixed by a mechanism and set as a third set of extrinsic parameters;
    a calibration pattern whose pattern and size are known, wherein when the first camera and the external camera face an identical direction, the calibration pattern is moved and rotated, and a first set of non-coplanar images is shot by the first camera and the external camera; when the second camera and the external camera face an identical direction, the calibration pattern is moved and rotated, and a second set of non-coplanar images is shot by the second camera and the external camera;
    a computation unit for intrinsic parameters which computes a first set of intrinsic parameters of the first camera, a second set of intrinsic parameters of the second camera, and a third set of intrinsic parameters of the external camera according to the first set of non-coplanar images and the second set of non-coplanar images; and
    a computation unit for extrinsic parameters computes the first set of extrinsic parameters, which comprises a rotation matrix and a translation vector, according to the first set of non-coplanar images, the first set of intrinsic parameters and the third set of intrinsic parameters; the computation unit for extrinsic parameters computes the second set of extrinsic parameters, which comprises a rotation matrix and a translation vector, according to the second set of non-coplanar images, the second set of intrinsic parameters and the third set of intrinsic parameters;
    wherein when the first camera is used as a reference camera, the computation unit for extrinsic parameters performs a reverse operation on the second set of extrinsic parameters to obtain a reversed second set of extrinsic parameters, multiplies the reversed second set of extrinsic parameters, the first set of extrinsic parameters and the third set of extrinsic parameters together to obtain a product, and performs a reverse operation on the product to obtain a rotation matrix and a translation vector (x, y, z) between the first camera and the second camera; or
    when the second camera is used as a reference camera, the computation unit for extrinsic parameters performs a reverse operation on the first set of extrinsic parameters to obtain a reversed first set of extrinsic parameters, multiplies the reversed first set of extrinsic parameters, the second set of extrinsic parameters and the third set of extrinsic parameters together to obtain a product, and performs a reverse operation on the product to obtain a rotation matrix and a translation vector (x, y, z) between the first camera and the second camera.

2. The system for computing the relative rotation and the relative translation of the back-to-back cameras according to claim 1, wherein the first camera and the second camera have a relative angle which is fixed, and the angles of the external camera is identical to the relative angle.

3. The system for computing the relative rotation and the relative translation of the back-to-back cameras according to claim 1, wherein the image center of the first camera is aligned with the image center of the second camera.

4. The system for computing the relative rotation and the relative translation of the back-to-back cameras according to claim 1, wherein the image center of the first camera is located at the right side of the image center of the second camera; the image center of the second camera is located at the right side of the image center of the first camera.

5. The system for computing the relative rotation and the relative translation of the back-to-back cameras according to claim 1, wherein the image center of the first camera is located at the left side of the image center of the second camera; the image center of the second camera is located at the left side of the image center of the first camera.

6. An electronic device using back-to-back cameras, comprising:
a first camera, wherein a viewing angle of the first camera is less than 180°; the first camera has a predetermined first set of extrinsic parameters, which comprises a predetermined rotation matrix and a predetermined translation vector of the first camera; the first set of extrinsic parameters is stored in an internal memory or an external memory of the first camera;
a second camera, wherein a viewing angle of the second camera is less than 180° and does not overlap with the viewing angle of the first camera; the second camera has a predetermined second set of extrinsic parameters, which comprises a predetermined rotation matrix and a predetermined translation vector of the second camera; the second set of extrinsic parameters is stored in an internal memory or an external memory of the second camera;
an automatic angle detection unit used to detect a relative angle between the first camera and the second camera, wherein the relative angle is variable on single axis; the automatic angle detection unit has a predetermined third set of extrinsic parameters, which is stored in an internal memory or an external memory of the automatic angle detection unit; after the relative angle changes, the automatic angle detection unit automatically corrects the third set of extrinsic parameters; and
an computation unit for extrinsic parameters is used to multiply the first set of extrinsic parameters, the second set of extrinsic parameters and the corrected third set of extrinsic parameters, together to obtain a product and to perform a reverse operation on the product to obtain a rotation matrix and a translation vector after the relative angle between the first camera and the second camera changes.

7. The electronic device using the back-to-back cameras according to claim 6, wherein the image center of the first camera is aligned with the image center of the second camera.

8. The electronic device using the back-to-back cameras according to claim 6, wherein the image center of the first camera is located at the right side of the image center of the second camera; the image center of the second camera is located at the right side of the image center of the first camera.

9. The electronic device using the back-to-back cameras according to claim 6, wherein the image center of the first camera is located at the left side of the image center of the second camera; the image center of the second camera is located at the left side of the image center of the first camera.

10. A method for computing a relative rotation and a relative translation of back-to-back cameras, wherein an external camera is installed next to a first camera and a second camera; viewing angles of the first camera, the second camera and the external camera are less than 180°; the external camera is arranged on a rotatable axis, which is inserted between the first camera and the second camera for flipping the external camera to face a direction identical with the first camera that overlaps their viewing angles, for flipping the external camera to face a direction identical with the second camera that overlaps their viewing angles; and after flipping, a flipped position and angles of the external camera is fixed by a mechanism and set as a third set of extrinsic parameters; the method comprises:

when the first camera and the external camera face an identical direction, moving and rotating a calibration pattern, and shooting a first set of non-coplanar images by the first camera and the external camera; when the second camera and the external camera face an identical direction, moving and rotating the calibration pattern, and shooting a second set of non-coplanar images by the second camera and the external camera;
respectively computing a first set of intrinsic parameters of the first camera, a second set of intrinsic parameters of the second camera and a third set of intrinsic parameters of the external camera according to the first set of non-coplanar images and the second set of non-coplanar images;
computing the first set of extrinsic parameters, which comprises a rotation matrix and a translation vector, according to the first set of non-coplanar images, the first set of intrinsic parameters and the third set of intrinsic parameters;
computing the second set of extrinsic parameters, which comprises a rotation matrix and a translation vector, according to the second set of non-coplanar images, the second set of intrinsic parameters and the third set of intrinsic parameters; and
when the first camera is used as a reference camera, performing a reverse operation on the second set of extrinsic parameters to obtain a reversed second set of extrinsic parameters, multiplying the reversed second set of extrinsic parameters, the first set of extrinsic parameters and the third set of extrinsic parameters together to obtain a product, performing a reverse operation on the product to obtain a rotation matrix and a translation vector (x, y, z) between the first camera and the second camera; or when the second camera is used as a reference camera, performing a reverse operation on the first set of extrinsic parameters to obtain a reversed first set of extrinsic parameters, multiplying the reversed first set of extrinsic parameters, the second set of extrinsic parameters and the third set of extrinsic parameters together to obtain a product, and performing a reverse operation on the product to obtain a rotation matrix and a translation vector (x, y, z) between the first camera and the second camera.

11. The method for computing the relative rotation and the relative translation of the back-to-back cameras according to claim 10, wherein the first camera and the second camera have a relative angle which is fixed, and the angles of the external camera is identical to the relative angle.

12. The method for computing the relative rotation and the relative translation of the back-to-back cameras according to claim 10, wherein the image center of the first camera is aligned with the image center of the second camera.

13. The method for computing the relative rotation and the relative translation of the back-to-back cameras according to claim 10, wherein the image center of the first camera is located the right side of the image center of the second camera; the image center of the second camera is located at the right side of the image center of the first camera.

14. The method for computing the relative rotation and the relative translation of the back-to-back cameras according to claim 10, wherein the image center of the first camera is located at the left side of the image center of the second camera; the image center of the second camera is located at the left side of the image center of the first camera.

* * * * *